United States Patent
Mills et al.

(10) Patent No.: US 7,644,355 B2
(45) Date of Patent: Jan. 5, 2010

(54) REPRESENTING REFLECTIVE AREAS IN A PRODUCT IMAGE

(75) Inventors: Joshua S. Mills, Marlborough, MA (US); Jeffrey R. Suarez, Cambridge, MA (US); Brian D. Hanechak, Waltham, MA (US)

(73) Assignee: Vistaprint Technologies Limited, Hamilton (BM)

( * ) Notice: Subject to any disclaimer, the term of this patent is extended or adjusted under 35 U.S.C. 154(b) by 261 days.

(21) Appl. No.: 11/498,519

(22) Filed: Aug. 3, 2006

(65) Prior Publication Data

US 2008/0031499 A1    Feb. 7, 2008

(51) Int. Cl.
*G06N 3/00*    (2006.01)

(52) U.S. Cl. ...................................... 715/234

(58) Field of Classification Search ................. 715/234, 715/243, 254, 255
See application file for complete search history.

(56) References Cited

OTHER PUBLICATIONS

Rost, OpenGL® Shading Language, Second Edition, published Jan. 25, 2006.*
Rost, Randi J., "OpenGL9r) Shading Language, Second Edition," Jul. 25, 2006, Chapter 12.

* cited by examiner

*Primary Examiner*—Kyle R Stork
(74) *Attorney, Agent, or Firm*—Robert L. Dulaney; Jessica J. Costa

(57) ABSTRACT

Shiny or reflective portions of a product surface, such as areas covered by foil, are represented to a user viewing a product image by a looped animation that simulates the visual effect of light on those reflective portions. The animation comprises a sequence of images generated by applying a gradient function to an image of the areas corresponding to the reflective portions of the product. To generate the individual images for use in the animation, the gradient function is applied at different offset positions relative to the product image.

7 Claims, 5 Drawing Sheets

REPRESENTING REFLECTIVE AREAS IN A PRODUCT IMAGE

FIELD OF THE INVENTION

This invention relates to the displaying of product images on an electronic display and, more particularly, to the displaying of images of products having portions or features with the attribute of being polished, reflective or shiny.

BACKGROUND OF THE INVENTION

Printing services Web sites allowing a user to access the site from the user's home or work and design a personalized product are well known and widely used by many consumers, professionals, and businesses. For example, VistaPrint Limited markets a variety of printed products, such as business cards, postcards, brochures, holiday cards, announcements, and invitations, online through the site VistaPrint.com. Typically, printing services sites allow the user to review thumbnail images of a number of customizable designs prepared by the site operator having a variety of different styles, formats, backgrounds, color schemes, fonts and graphics from which the user may choose. When the user has selected a specific product template design to customize, the sites typically provide online tools allowing the user to incorporate the user's personal information and content into the selected template to create a custom document design. When the design is completed to the user's satisfaction, the user can place an order through the site for production and delivery of a desired quantity of the corresponding printed product.

Printing services sites strive to have the image of the product that is displayed to the customer on the customer's computer display be as accurate a representation as possible of the physical product that the user will later receive. Trying to simulate on the user's computer display the visual effect of areas of the product that are foil has historically posed a problem. The foils that are often found on holiday cards and other printed products are typically quite shiny and reflect ambient light hitting the foil surface. Simulating the effect of light striking the surface of foil using a computer display has not proven easy to achieve.

Without clear visual cues to assist the customer in recognizing the foil areas in a displayed product image and distinguishing those areas from the non-foil areas, a customer may misunderstand the type or locations of the materials used on the product or may decline to place an order because of uncertainty. To minimize the risk of customer confusion and disappointment, it is highly desirable that the customer be shown an image of the product that is as accurate a depiction of the physical product as possible and that indicates the foil regions of the product in an understandable way. There is, therefore, a need for systems and methods for preparing product images for displaying on a user's computer display in a manner that indicates the location or locations in the product design of reflective materials by suggesting the effects of light on those materials and clearly distinguishes those regions from other regions of the product.

SUMMARY

The present invention is directed at satisfying the need for automated systems and methods for generating images of products for displaying on a user's computer display in a manner that indicates the location of reflective or shiny materials by suggesting the effects of light on those materials and that enables the user to distinguish those shiny regions from other regions of the product In accordance with one embodiment of the invention, a number of variation images are generated by applying a gradient function to the portions of a product image corresponding to reflective areas in the product, with each variation image being generated with the gradient function applied at a different offset position, such that when the variation images are sequentially displayed at the user computer, the effect of light motion on the reflective areas is represented in the product image.

It is an advantage of the invention that a user is given visual cues to assist the user in recognizing and distinguishing between different materials used in the product.

These and other objects, features and advantages of the invention will be better understood with reference to the accompanying drawings, description and claims.

DETAILED DESCRIPTION

It will be understood that, while the discussion herein describes an embodiment of the invention in the field of preparation of customized printed materials having foil regions, it will be understood that the invention is not so limited and could be readily employed in any embodiment involving the presentation of an electronic image of any type of product wherein it is desired to indicate metal, glass, or other materials that are shiny, polished or otherwise have light reflective properties.

Figure 1:
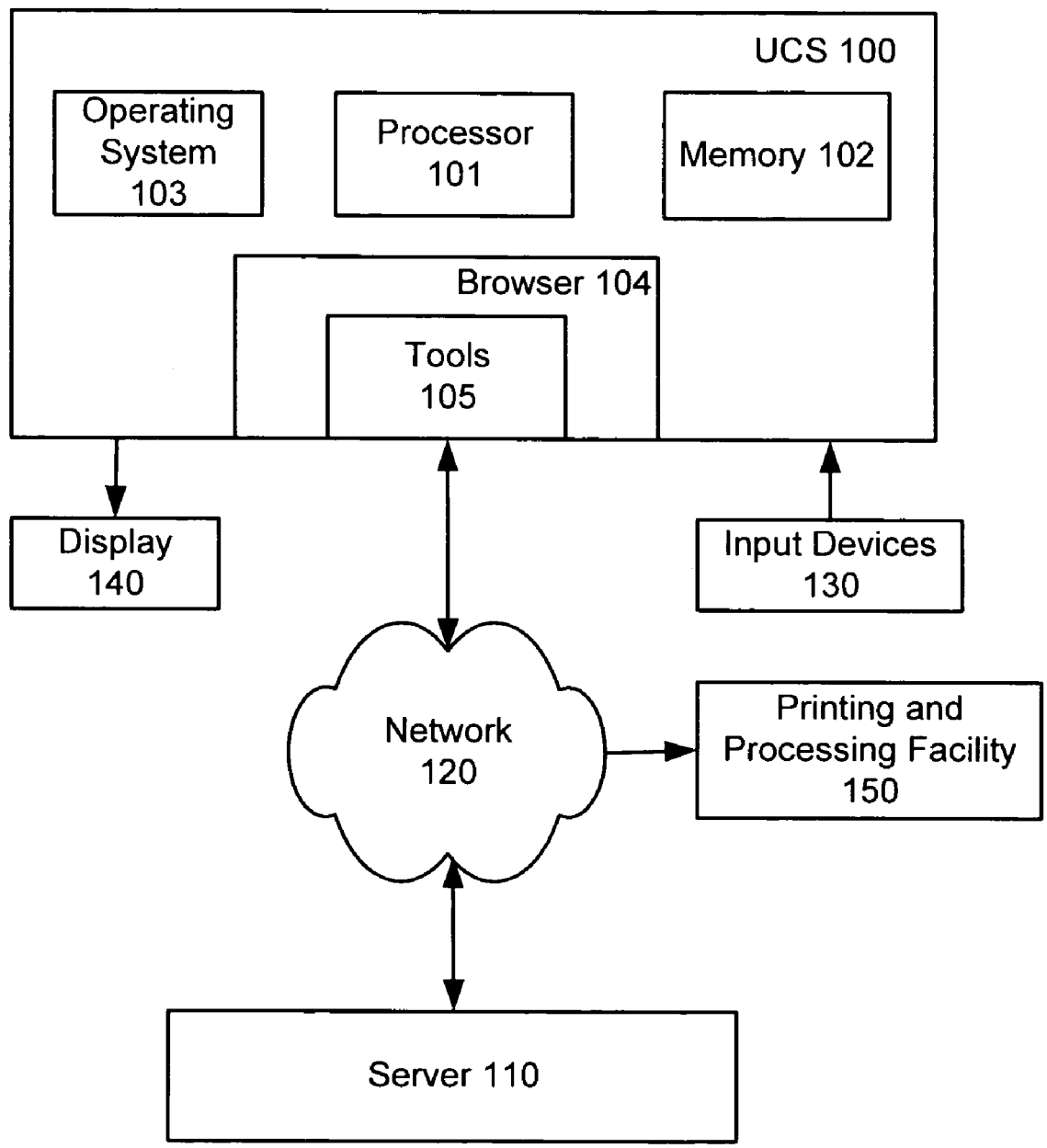
FIG. 1 shows an illustrative system with which the invention may be employed.

FIG. 1 depicts one illustrative system with which the invention may be employed. User computer system UCS 100 includes processor 101 and memory 102. Memory 102 represents all UCS 100 components and subsystems that provide data storage for UCS 100, such as RAM, ROM, and internal and external hard drives. In addition to providing permanent storage for all programs installed on UCS 100, memory 102 also provides temporary storage required by the operating system and any application program that may be executing. In the embodiment described herein, UCS 100 is a typically equipped personal computer, but UCS 100 could also be any other suitable device for interacting with server 110, such as a portable computer, a tablet computer, or a computer system particularly adapted or provided for electronic product design, such as a product design kiosk, workstation or terminal. The user views images from UCS 100 on display 140, such as a CRT or LCD screen, and provides inputs to UCS 100 via input devices 110, such as a keyboard and a mouse.

When UCS 100 is operating, an instance of the USC 100 operating system, for example a version of the Microsoft Windows operating system, will be running, represented in FIG. 1 by operating system 103. In FIG. 1, UCS 100 is running a Web browser 104, such as, for example, Internet Explorer from Microsoft Corporation. In the depicted embodiment, Tools 105 represents product design and ordering programs and tools downloaded to UCS 100 via Network 120 from remote Server 110, such as downloadable product design and ordering tools provided by VistaPrint Limited and publicly available at VistaPrint.com. Tools 105 runs in browser 104 and exchanges information and instructions with Server 110 during a design session to support the user's preparation of a customized product. When the customer is satisfied with the design of the product, the design can be uploaded to Server 110 for storage and subsequent production of the desired quantity of the physical product on appropriate printing and post-print processing systems at printing and processing facility 150. Facility 150 could be owned and operated by the operator of Server 110 or could be owned and operated by another party.

While Server 110 is shown in FIG. 1 as a single block, it will be understood that Server 110 could be multiple servers configured to communicate and operate cooperatively to support Web site operations. Server 110 will typically be interacting with many user computer systems, such as UCS 100, simultaneously. Server 110 includes the components and subsystems that provide server data storage, such as RAM, ROM, and disk drives or arrays for retaining the various product layouts, designs, colors, fonts, and other information to enable the creation and rendering of electronic product designs.

In interacting with server 110 to create a custom product design, the user is typically presented with one or more screen displays (not shown) allowing the user to select a type of product for customization and then review thumbnail images of various product design templates prepared by the site operator and made available for customization by the user with the user's personal text or other content. To provide the customer with a wide range of styles and design choices, each product design template typically comprises a combination of graphics, images, fonts, color schemes, and/or other design elements. When a specific product template design is selected by the user for customization, the markup language elements and layout instructions needed for browser 104 to properly render the template at the user's computer are downloaded from server 120 to UCS 100.

Figure 2:
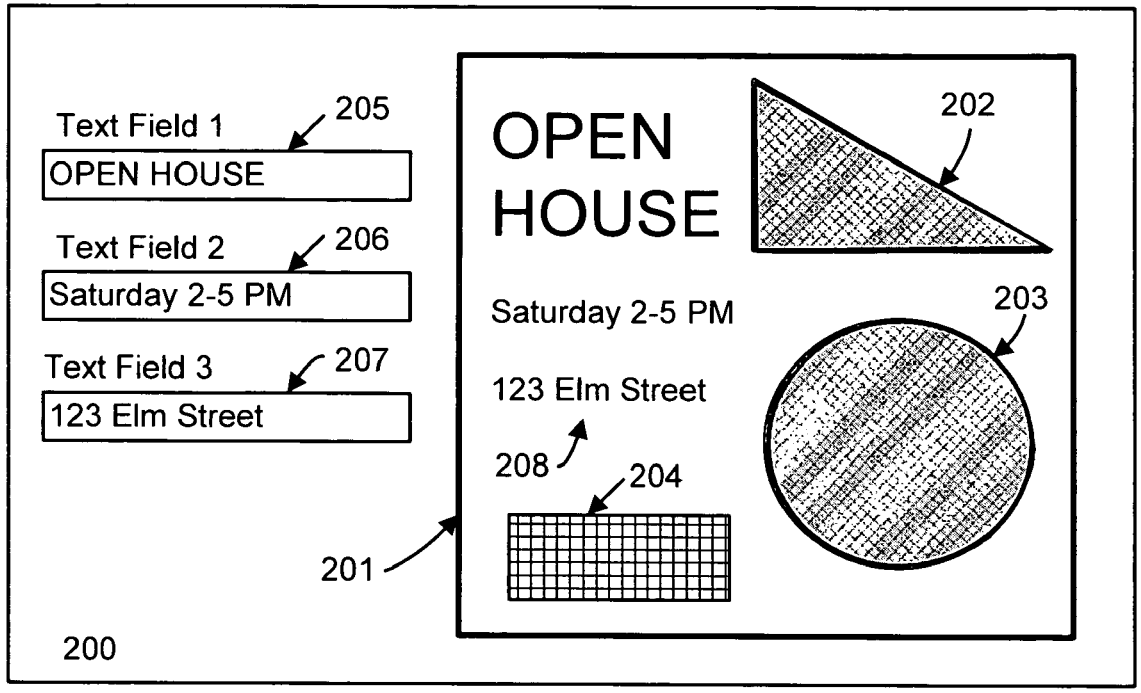
FIG. 2 shows a simplified representation of a product design screen.

In FIG. 2, a product design selected by a user is displayed in customization window 200 along with text entry fields 205-207. It will be understood that FIG. 2 depicts a simplified example for discussion purposes and screen 200 would typically include various additional text fields, information, instructions, and controls. In the illustrative example depicted in FIG. 2, the user is preparing an invitation to an event and has entered text in fields 205-207. The product template image 201 has been updated accordingly to incorporate those text entries in region 208 of the product template.

Product design 201 includes regions 202 and 203 where foil will be positioned on the surface of the finished product. As will be discussed in more detail below, while design 201 is being displayed, the user will see a visual effect that appears to the user to be diagonal regions of light and dark color variation moving back and forth across regions 201 and 202 to provide a visual indication to the user that these regions of the physical product will be foil Non-foil regions of the template design will not display the light effects. One possible instantaneous position of the variation effect is depicted in FIG. 2. As will be discussed below, the movement perceived by the user is generated by a looped GIF animation.

As is well understood in the art, a markup language product design image displayed to a user is a composite of a number of content layers assembled in the user's browser according to the z-index values assigned to the various layers in the markup language description of the product. In the disclosed embodiment, the component of product design 201 corresponding to foil components 202 and 203 is a separate layer. User text 208 and other images or design content in the product design, such as image 204, are positioned in yet other layers.

Figure 3:
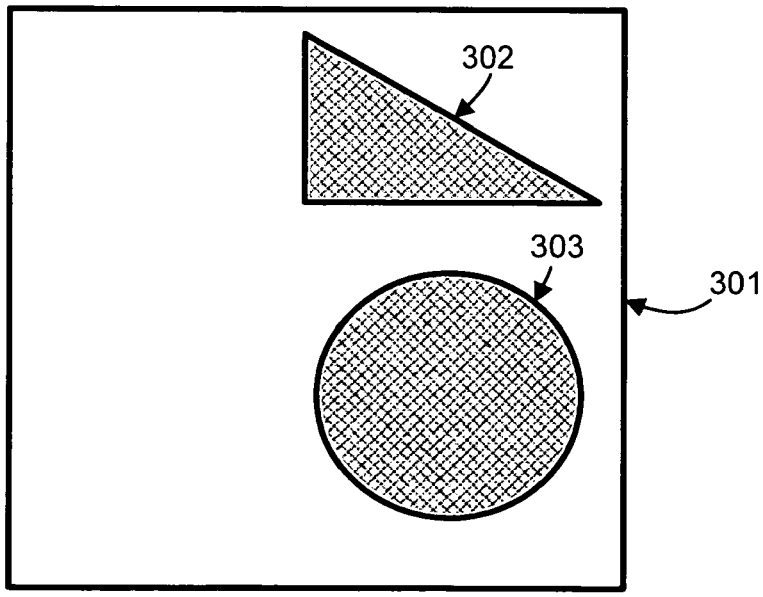
FIG. 3 shows the foil portions of product design 201.

FIG. 3 depicts layer 301 containing the basic foil images 302 and 303 prior to application of the gradient function. As will be discussed below, by applying the gradient function at a plurality of different offsets relative to layer 301, a plurality of variation images can be generated. Displaying the variation images as an animation loop, for example, at five variation images per second, makes the diagonal effects created by the gradient function appear to move back and forth across foil areas 202 and 203. While the example discussed herein has two foil areas 202 and 203 for illustration, it will be understood that the invention can be employed with product designs having foil areas of any number of different sizes, shapes and positions and other portions of the design, such as one or more of the text entries, could also be foil areas.

As is well known and understood in the art, color images displayed on computer monitors are comprised of many individual pixels with the displayed color of each individual pixel being the result of the combination of the three colors red, green and blue (RGB). In a typical display system providing twenty-four bits of color information for each pixel (eight bits per color component), red, green and blue are each assigned an intensity value in the range from 0, representing no color, to 255, representing full intensity of that color. By varying these three intensity values, a large number of different colors can be represented.

Figure 4:
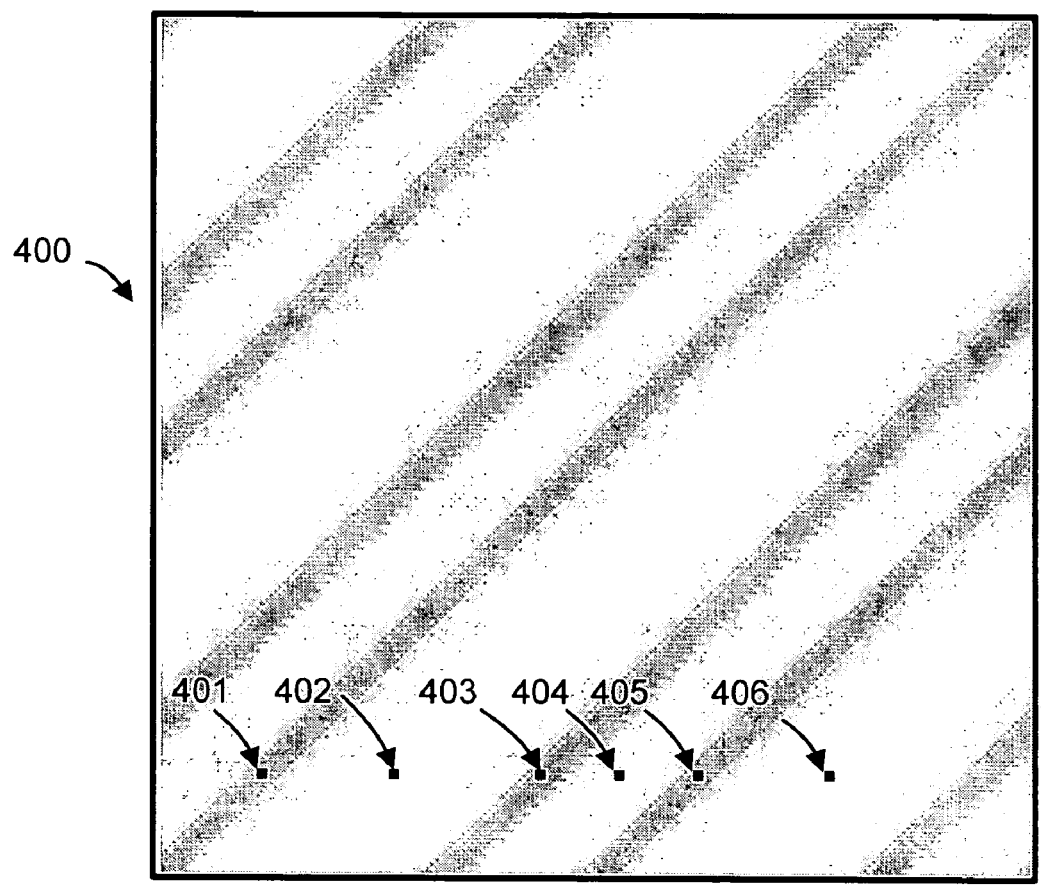
FIG. 4 is a representation of the lightening and darkening effect of one embodiment of a gradient function.
Figure 5:
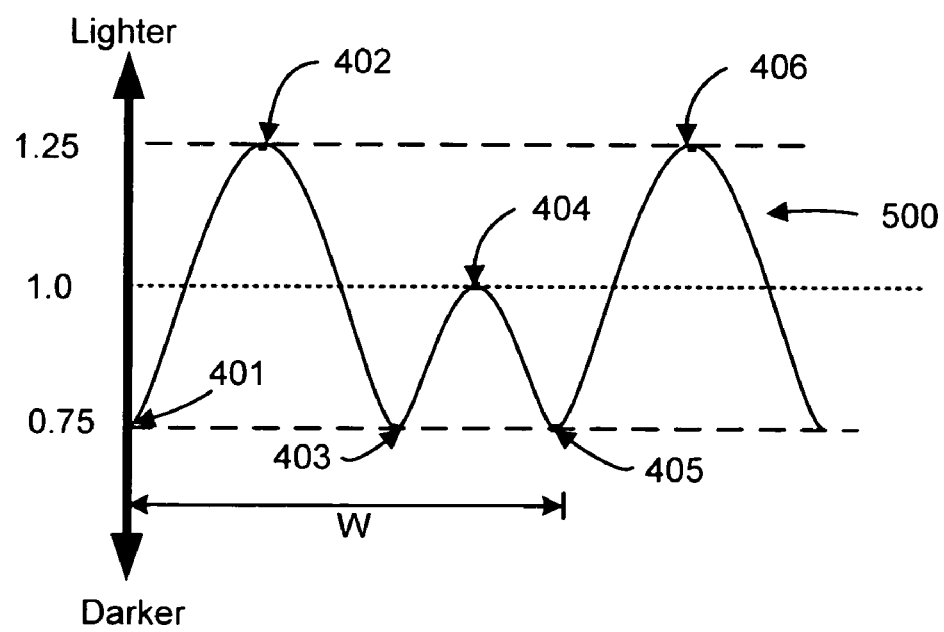
FIG. 5 is a graphical representation of one embodiment of a gradient function.

Referring to FIGS. 4 and 5, one illustrative embodiment of a gradient function will now be discussed. FIG. 4 illustrates the general color lightening and darkening effects resulting from the application of the gradient function, as will be described below. In the disclosed embodiment, the red, green and blue intensity levels of each pixel in the foil region image are varied according to the function graphically represented in FIG. 5. Further, in this embodiment, for each succeeding row of pixels, the gradient function is offset horizontally by one pixel. Incrementally offsetting each horizontal row yields the repeating series of darker and lighter diagonal regions shown in FIG. 4. It will be appreciated that the gradient could be applied in other manners. For example, applying the gradient without changing the horizontal offset for each row of pixels would result in the darker and lighter regions running vertically. As another example, the gradient could be applied to pixel columns in the foil images rather than pixel rows.

In the depicted example, the gradient function comprises a first sine curve, for example between pixel 401 and pixel 403, and a second sine curve, for example, between pixel 403 and pixel 405. In the disclosed embodiment, the pattern repeats every 200 pixels (W=200 pixels). Each horizontal pixel location corresponds, according to the gradient function, to a multiplication factor as indicated on the vertical axis. The first sine curve yields multiplication values from 0.75 to 1.25 while the second curve yields multiplication factors from 0.75 to 1.0. For each pixel, the value of the red, green and blue intensity values will be multiplied by the corresponding factor for that pixel location. For example, referring to pixel 402, each of the three RGB intensity values will be multiplied by 1.25, making that pixel relatively lighter. Because no intensity value can exceed the maximum value of 255, the product of the multiplication is capped at that number. Referring to pixel 403, all three of the RGB values will be multiplied by 0.75, making that pixel relatively darker.

It will be understood that the function and multiplication factors described herein are merely representative and that different values for the multiplication factors and different types of gradient functions could be employed. For example, the definition of the gradient function in terms of one or more sine curves is not essential. The gradient function could be generated using other curves, shapes or mathematical functions. Similarly, it is not essential that the gradient function be based on or contain a regularly repeating pattern.

Figure 7:
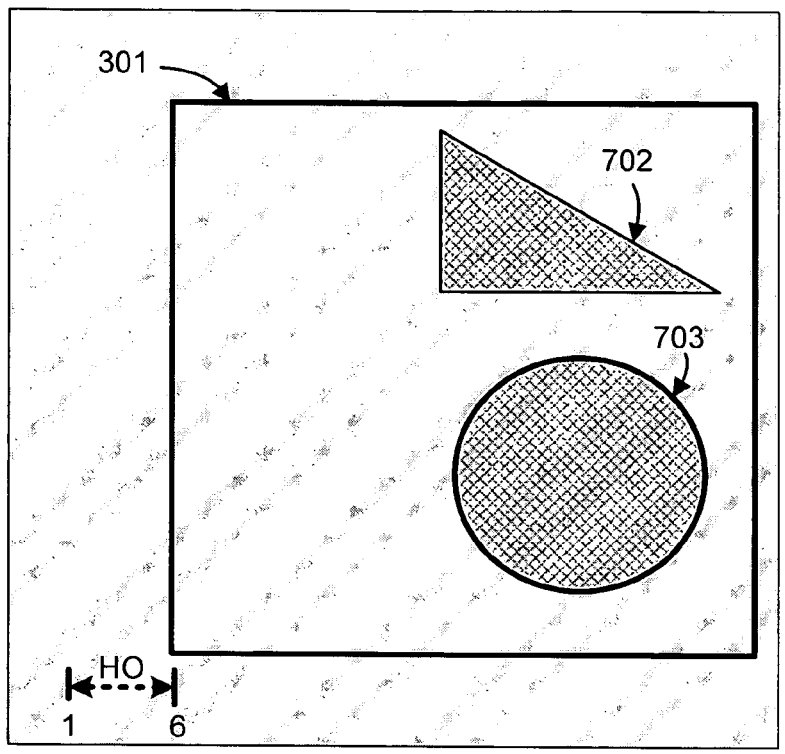
FIG. 7 is an illustration of the application of the gradient function to the reflective areas of a product image at another position.
Figure 6:
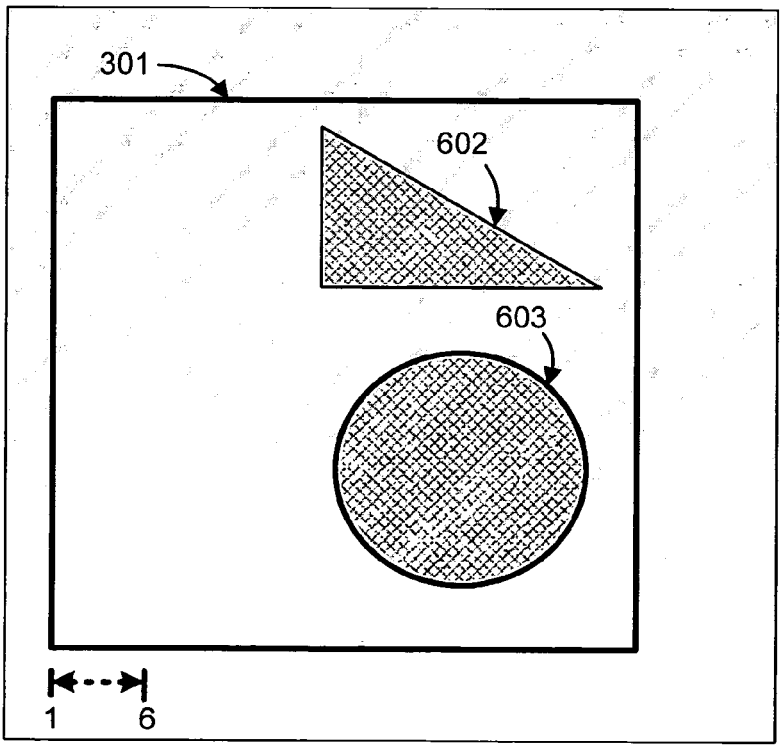
FIG. 6 is an illustration of the application of the gradient function to the reflective areas of a product image at a first position.
Figure 8:
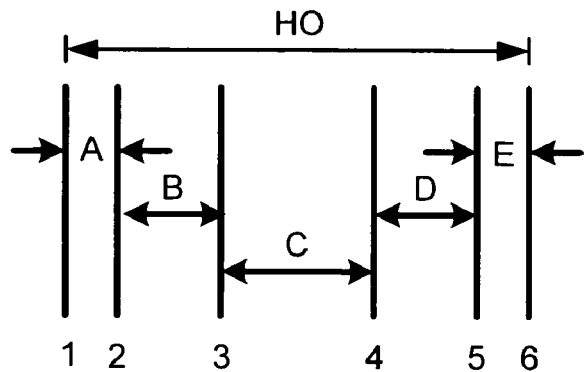
FIG. 8 depicts one embodiment of offsets between applications of the gradient function.

Referring now to FIGS. 6, 7 and 8, the application of the gradient function to the foil portions of the template image to create variations of the foil image for use in an animation will be discussed. As discussed above, the gradient is a mathematical function applied to each row of pixels in the foil regions to relatively increase or decrease the RGB intensities of the pixels. In FIGS. 6 and 7, a large gradient field illustrating the lightening and darkening effect is shown for the purpose of assisting in the visualization and explanation of the offset effect of applying the gradient function at various offsets to the image content of foil regions. As mentioned above in connection with FIG. 2, when the product image is being displayed to the user, the user only sees the gradient light effects in the foil regions of the product image, such as foil regions 202 and 203 in product image 201.

FIG. 6 depicts the result when the gradient function is applied to foil layer 301 at a first relative position. This first position is conceptually indicated in FIG. 6 as the left edge of foil layer 301 being at horizontal position 1. As will be discussed, the gradient function will be applied at a total of six different horizontal positions to create six variations of image layer 301. The results from applying the gradient at the sixth position is indicated in FIG. 7, where the left edge of foil layer 301 is located at horizontal position 6. Each offset results in the lightening and darkening of different pixels in the foil areas, as can be seen by comparing the positions of the gradient effects in foil area variations 602 and 603 with the position of the effects in foil area variations 702 and 703. In the embodiment discussed herein, the horizontal offset distance HO from position 1 to position 6 is 36 pixels. Four additional variations (not shown) are created at different positions between position 1 and position 6.

The six variations of foil layer 301 are not created at equal incremental offsets between position 1 and position 6. Referring to FIG. 8, the first variation image is created at position 1, as discussed above. The second variation image is created at position 2 which is offset from position 1 by offset A, the third variation image is created at position 3 which is offset from position two by offset B, and so forth. In the disclosed embodiment, offsets A and E are four pixels, offsets B and D are eight pixels, and offset C is 12 pixels. By creating the variation images using offset distances of varying widths, when the six images are displayed as an animation the simulated light effect will appear to the user to move across the foil areas at a varying rate. It will be appreciated that other offset distances and proportions could be employed and more or fewer than six variation images could be used.

Figure 9:
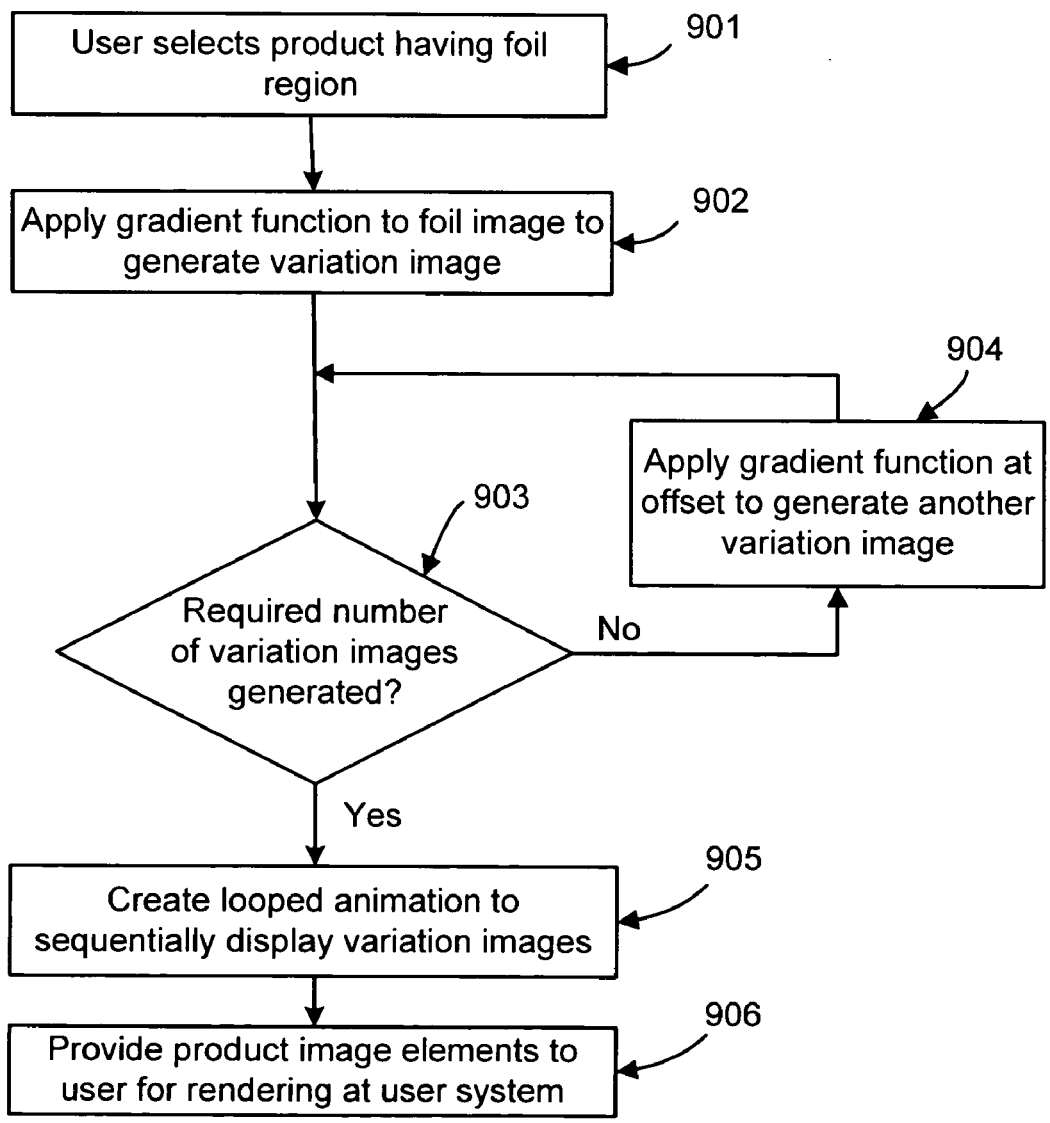
FIG. 9 is a flowchart of one method for employing the invention.

Referring now to FIG. 9, one method of employing the gradient function will be discussed. At step 901, a user selects a product design having one or more foil regions, such as product design 201 having foil regions 202 and 203. At step 902 the gradient function is applied to each pixel in the foil regions of the image to generate a variation image as discussed above. At step 903, if all six variation images used in the animation in this embodiment have not yet been generated, the gradient function is offset by the appropriate incremental distance A-E from the previous offset position and another variation image is generated until the required number of variation images have been created. When the six variation images have been created, they are arranged into a looped GIF animation of ten images with the images repeatedly displayed in a proper position number sequence, e.g. 1-2-3-4-5-6-5-4-3-2, such that the simulated light effect generated by the application of the gradient function appears to move back and forth across the foil image. Techniques for creating GIF animations are well known in the art. In the disclosed embodiment, the animation cycles through the ten images every two seconds.

Because the gradient function is only applied to the portions of the product image that correspond to the reflective areas of the product, these areas of the product image are made clearly distinguishable to the user on the user's computer display. Simulated light effects will be seen as moving across the foil areas, but no similar effects will seen on the paper areas of the product.

While an exemplary embodiment of the invention has been discussed, the described embodiment is to be considered as illustrative rather than restrictive. The scope of the invention is as indicated in the following claims and all equivalent methods and systems.

What is claimed is:

1. A computer-implemented method for indicating one or more reflective product areas in a displayed image of the product the method comprising:

obtaining a markup language description of a product image, the description comprising one or more non-foil content layers with markup language components describing content corresponding to non-foil regions of the product image, and one or more foil content layers corresponding to one or more reflective regions of the product, wherein each of the foil content layers are assigned via the markup language description to different z-index values than the non-foil content layers;

for each foil content layer, generating a plurality of image variations of the corresponding foil content layer and associating the plurality of image variations with the corresponding foil content layer, the plurality of image variations generated by applying a gradient function to one or more fixed groups of a plurality of pixels in the corresponding foil content layer, the gradient function comprising a same mathematical function applied to each fixed group of pixels to relatively increase or decrease respective intensities of the pixels, each of the image variations being generated with the same gradient function applied at a different offset position, each offset position resulting in varying the intensity of different pixels in each of the one or more fixed groups of pixels; and providing the markup language description and each of the non-foil content layers and the foil content layers and associated image variations to a user computer for assembling all of the non-foil content layers and the foil content layers in the user's browser according to the z-index values assigned to the respective layers in the markup language description of the product image, the markup language description providing instructions to the user computer to sequentially display the corresponding image variations of each of the non-foils layers such that the effect of light motion on the one or more reflective areas of the product is represented in the product image.

2. The method of claim 1 wherein the sequence is displayed as a repeating loop.

3. The method of claim 1 wherein the offset positions are unequally spaced apart.

4. A computer-implemented method for indicating one or more reflective product areas in a product image at a user system executing a browser program, the method comprising receiving a markup language description of a product image to be displayed to a user, the description comprises one or more non-foil content layers with markup language components describing content corresponding to non-foil regions of the product image, and one or more foil content layers corresponding to one or more reflective regions of the product, wherein each of the foil content layers are assigned via the markup language description to different z-index values than the non-foil content layers, and each foil content layer has associated therewith multiple variation images generated by applying a gradient function to one or more fixed groups of a plurality of pixels in the corresponding foil content layer, the gradient function comprising a same mathematical function applied to each fixed group of pixels to relatively increase or decrease respective intensities of the pixels, each of the image variations being generated with the same gradient function applied at a different offset position, each offset position resulting in varying the intensity of different pixels in each of the one or more fixed groups of pixels; and displaying the product image to the user by assembling all of the non-foil content layers and the foil content layers in the user's browser according to the z-index values assigned to the respective layers in the markup language description of the product image such that the non-foils layers each sequentially displays their corresponding variation images such that the effect of light motion on the one or more reflective areas of the product is represented in the product image.

5. The method of claim 4 wherein the variation images are displayed as a repeating loop.

6. The method of claim 4 wherein the offset positions are unequally spaced apart.

7. The method of claim 4 wherein the markup language description is received from a remote server.

* * * * *